June 29, 1965    F. C. HIDALGO    3,191,368
LAWN EDGER ATTACHMENT FOR POWER MOWER
Filed Feb. 3, 1964    2 Sheets-Sheet 1
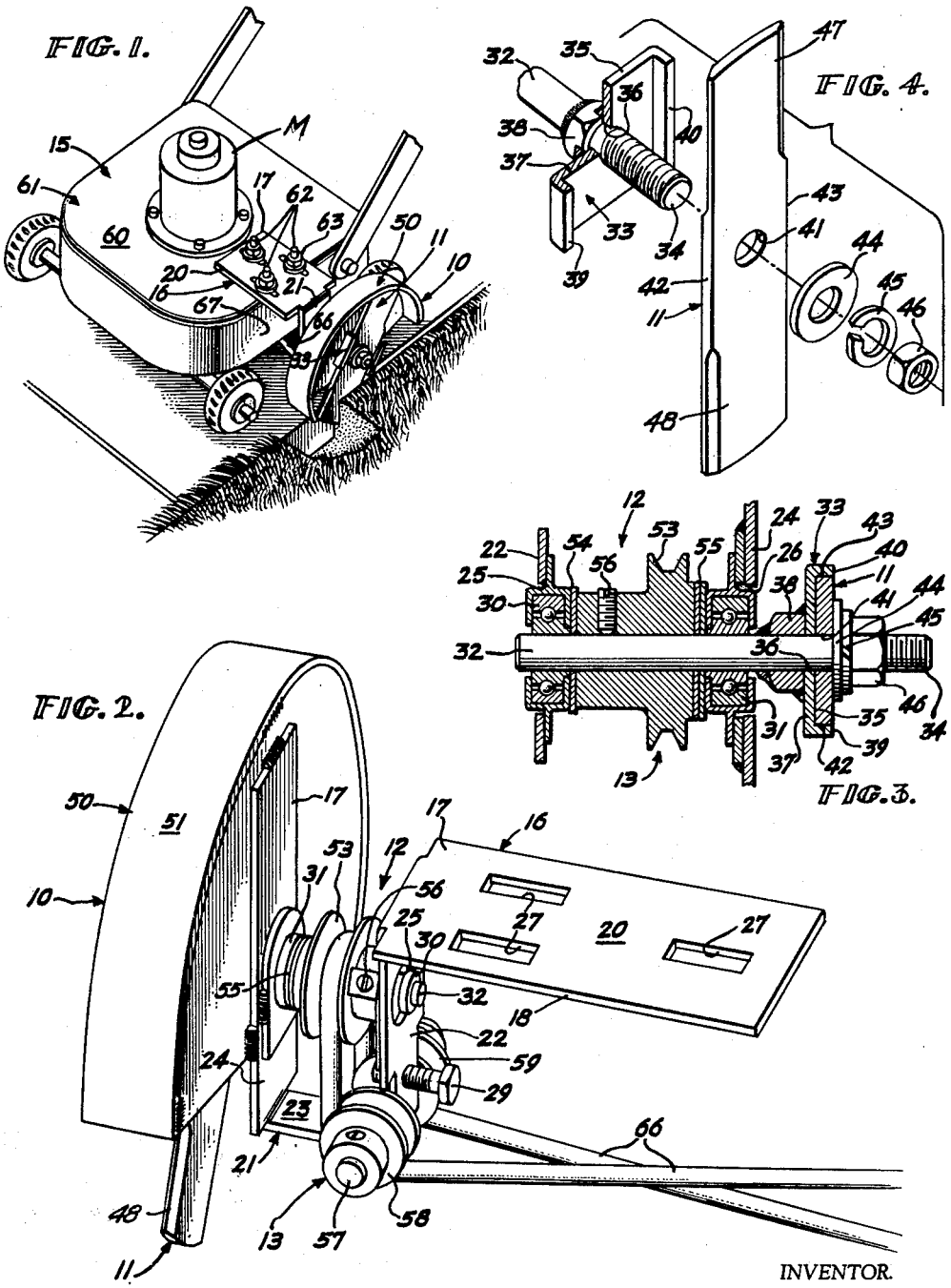
INVENTOR.
FRED C. HIDALGO
BY
Hansen and Lane
HIS ATTORNEYS.

June 29, 1965 F. C. HIDALGO 3,191,368
LAWN EDGER ATTACHMENT FOR POWER MOWER
Filed Feb. 3, 1964 2 Sheets-Sheet 2

INVENTOR.
FRED C. HIDALGO
BY
Hansen and Lane
HIS ATTORNEYS.

United States Patent Office 3,191,368
Patented June 29, 1965

3,191,368
LAWN EDGER ATTACHMENT FOR POWER MOWER
Fred C. Hidalgo, 15360 Charmeran Ave., San Jose, Calif.
Filed Feb. 3, 1964, Ser. No. 342,114
4 Claims. (Cl. 56—25.4)

This invention relates to lawn edge trimmers and more particularly to such an attachment for power mowers.

The present invention is particularly directed to a novel arrangement and construction of a lawn edge trimmer attachment adapted for mounting on an existing conventional power mower. The device of the present invention is most suitable for use on a power mower having a rotary cutter concealed under a hood and mounted on a wheeled carriage for movement over a lawn.

The lawn edge trimmer of the present invention comprises an attachment adapted to be secured to the hood of the power mower.

It is another object of this invention to provide in this attachment a mounting plate having an arbor frame at one end thereof and means for adjusting the same laterally of a mower housing to tension the drive belt connection therewith and to stabilize the edger during its operation by the mower.

It is another object to provide a cutter blade seat on the arbor shaft for positively turning the blade with such shaft.

These and other objects and advantages of the present invention will become apparent from a reading of the following description in the light of the accompnaying drawing in which:

FIG. 1 is a perspective view of a power mower having a lawn edger attachment in accordance with the present invention mounted thereon.

FIG. 2 is an enlarged perspective view of the lawn edger attachment of FIG. 1 as seen from the opposite side thereof.

FIG. 3 is a sectional detail through the arbor, shaft and mounting for the lawn edger blade of my attachment.

FIG. 4 is an exploded perspective view of a portion of the arbor shaft, blade seat, blade and securing means therefor.

Figure 5:
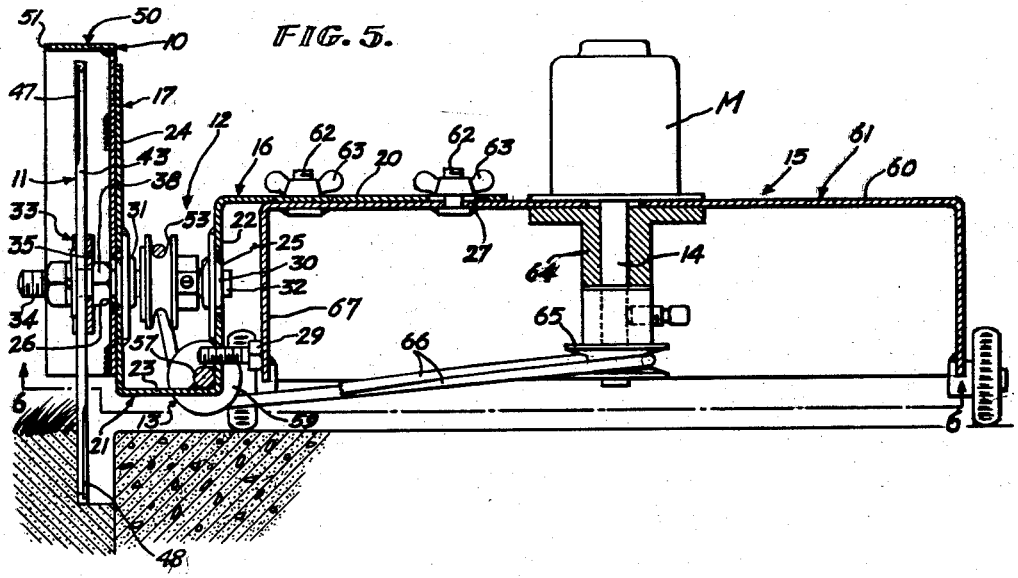
FIG. 5 is a vertical section taken radially from the power mower and along the axis of the attachment embodying the present invention.
Figure 6:
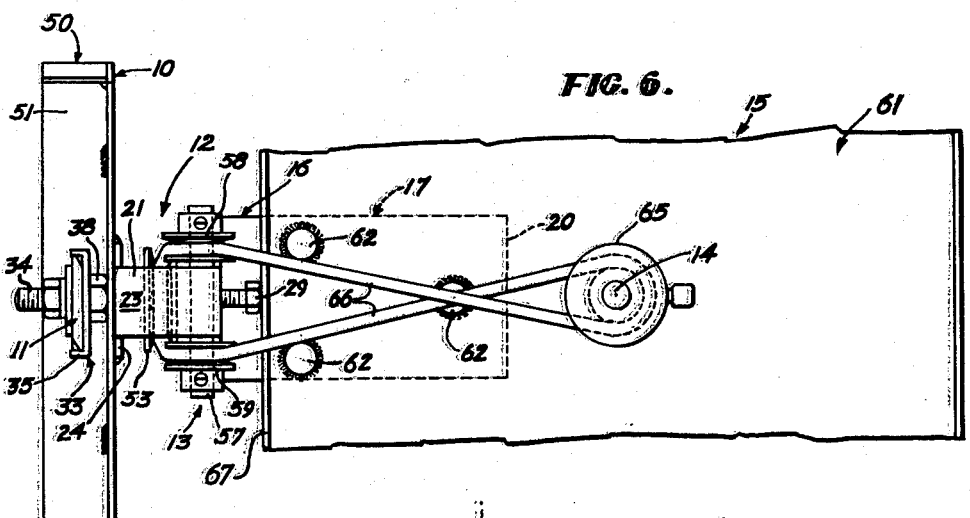
FIG. 6 is a bottom plan view of FIG. 5.

The lawn edge trimmer of the present invention generally designated 10 has in common with conventional trimmers a blade 11 mounted on an arbor 12 drivingly connected by means 13 such as pulleys and a belt to the main drive shaft 14 of the power mower 15. The present invention is directed to the attachment feature 16 and the manner of constructing the same for connection to the mower 15 and for driving the trimmer blade from the main drive shaft 14 of the mower.

Figure 7:
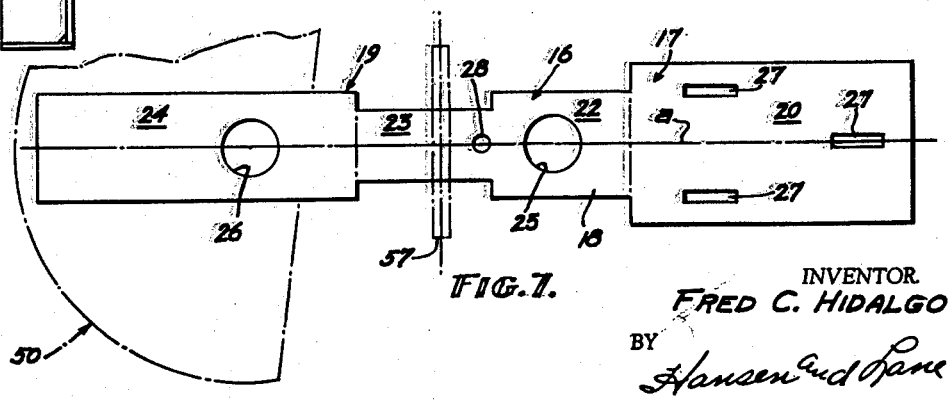
FIG. 7 is a layout of a blank stamping preliminary to its formation into the frame and mounting of the attachment of the present invention.

The attachment 16 comprises a main body 17 formed from a single piece of heavy gauge metal 18 which is initially stamped out as a blank 19 illustrated in flat form in FIG. 7. This blank 19 includes a mounting plate 20 and is preferably formed to provide a U-shaped frame 21 at one end thereof. The U-shaped frame consists of a first or inner leg 22 having its upper end connected to one end of the mounting plate; a bight portion 23 and a second or outer leg 24.

The inner leg 22 is bent downwardly at right angles to the mounting plate 20. The bight 23 is bent oppositely at right angles to the inner leg 22 so as to extend outwardly therefrom, parallel to the mounting plate 20 and offset therefrom by the length of the inner leg 22. The other or outer leg 24 is bent upwardly from the bight portion 23 into parallel relation to the inner leg 22 and is spaced from the latter by the length of the bight portion 23.

As best illustrated in FIG. 7 both legs 22 and 24 of the U-shaped frame 21 are narrower than the mounting plate 20 and wider than the bight portion 23. Each leg 22 and 24 has a circular portion punched out along its axis $a$ to form an opening 25 and 26 in the respective legs 22 and 24. These openings have their centers equidistant from the bight portion 23 so as to be aligned axially with each other when the legs 22 and 24 extend parallel to each other from the bight portion 23.

While the blank 19 is yet in flat condition as seen in FIG. 7 the mounting plate 20 has a plurality of slots 27 stamped out by punch press method. There are preferably three such slots 27 each extending parallel to the length or axis $a$ of the blank and in triangular array, two adjacent the outer end and equally spaced from and on opposite sides of the axis $a$ of the mounting plate and one adjacent the inner end thereof aligned with the axis $a$.

Between the opening 25 and the bight 23 the inner leg has a small bore 28 which is tapped or threaded to receive a bolt 29 for reasons later to be explained.

The arbor 12 (FIGS. 3 and 5) consists of a pair of bearings, one 30 of which is mounted on the inner leg 22 and the other one 31 of which is mounted on the outer leg 24. These bearings are secured to the legs 22 and 24 co-axially of and within the respective openings 25 and 26 thereof. The arbor 12 further includes a shaft 32 journaled in the bearings 30 and 31 for free turning within the U-shaped frame 21.

The outer end of the shaft 32 has a blade mounting seat 33 formed thereon inwardly of its outer terminal end 34. This seat 33 comprises a channel shaped member 35 having a central bore 36 formed in its web 37 the after side of which web is welded to a hub 38. The hub 38 is welded to the shaft 32 so that the hub and channel become an integral part of the shaft to turn therewith.

The flanges 39–40 of the channel member 35 are spaced from each other exactly the width of the blade 11 with sufficient clearance to receive the blade and thereby transmit turning force to the blade from the shaft 32. The assembly of the blade 11 with the shaft 32 and seat 33 is illustrated in FIG. 4. Here it will be noted that the blade 11 has a central bore 41 which fits the threaded end 34 of the shaft 32. The side edges 42 and 43 of the blade bear against the respective flanges 39 and 40 of the channel 35 when the blade is mounted in the seat 33. Suitable washers 44–45 and a nut 46 are mounted on the threaded end 34 of the shaft 32 to secure the blade 11 in the seat 33. It will thus be noted that the blade 11 is removably keyed to the shaft 32 for turning therewith in a manner to prevent slippage of the blade relative to the shaft.

The blade 11 is of the chopper type in that it is a straight blade having diametrically opposite cutting ends 47 and 48 each beveled and sharpened in a zone adjacent the extremities of the side edges 42 and 43 of the blade. A suitable guard hood 50 is secured to the outer leg 24 of the U-shaped frame 21 and has a peripheral flange 51 extending over the blade to deflect the spray of dirt and turf as the blade revolves within the hood 50.

As the shaft 32 is inserted into the bearings 30 and 31 from outside the U-shaped frame 21 a pulley 53 is mounted on the shaft 32 between the bearings 30 and 31. Suitable washers 54–55 are mounted on the shaft 32 to space the pulley 53 from the bearings and the pulley 53 is secured to the shaft 32 by a set screw 56. In this manner the shaft 32 is held in journaled relation with the bearings 30 and 31.

The pulley means 13 further includes a countershaft 57 mounted on the U-shaped frame 21 transverse to the arbor shaft 32 to receive and support two pulleys 58 and 59 at right angles to the pulley 53. The countershaft 57 is preferably secured as by welding to the bight portion 23 and to the inner leg 22 where they merge. Part of each side of the leg 22 is recessed to a width comparable to that of the bight portion 23 to allow the pulleys 58 and 59 to be received by the countershaft 57 in planes directly beneath the groove in the pulley 53. The pulleys 58 and 59 are mounted on suitable bearing bushings which in turn ride upon the respective ends of the countershaft 57.

The mounting plate 20 is disposed to be mounted on the top 60 of the guard hood 61 of the power mower 15. Three stud bolts 62 extend up through the top 60 of the hood 61 in spaced relation to register with the slots 27 formed in the mounting plate 20. These bolts 62 have their heads welded to the underside of the top 60 of hood 61 and their opposite threaded ends are adapted to receive thumb nuts 63.

The bolts 62 are so disposed on the hood 61 that the mounting plate 20 extends radially from shaft 14 to one side of the mower hood 61.

The shaft 14 of the mower 15 extends downwardly from the hood 61, concentrically thereof and from a motor M mounted on the hood 61. The shaft 14 extends through a bushing 64 and normally would have a rotary blade (not shown) secured thereto for mowing a lawn. However, when the lawn edge trimmer of the present invention is attached to the mower the grass cutting blade is removed from the shaft 14 and a pulley 65 comparable to the one 53 on the arbor shaft 32 is mounted on and secured to the mower shaft 14.

The means 13 includes a belt 66 trained over the top of the pulley 53 so that both strands are directed down under the pulleys 58 and 59 on the countershaft 57, thence the belt extends horizontally to and around the pulley 65 on the mower shaft 14.

With the attachment 16 mounted on the left side of the mower 15 as illustrated in FIG. 1 it is desirable to turn the edger blade 11 clockwise as seen in FIG. 1 so that earth, turf and clipping will be cast forwardly as the mower is pushed along. Since the mower shaft 14 usually turns clockwise it will be necessary to twist the strands of the belt 66 between the pulleys 58 and 59 and the one 65 on the mower shaft 14.

With the belt 66 thus trained over the pulleys 53, 58, 59 and 65 the belt must be tensioned sufficiently to obtain maximum power transmission to the arbor shaft 32. The wing nuts 63 are first loosened relative to the bolts 62 sufficiently to permit the mounting plate 20 to slide along the top 60 of the hood 61 for adjustment. The bolt 29 previously mentioned as being threaded into the tapped bore 28 in the inner leg 22 of the frame 20 is now turned to withdraw from the latter. The head of the bolt 29 is disposed to bear against the adjacent skirting 67 of the mower hood 61. In this manner the entire attachment 16 is shifted radially outwardly relative to the mower hood 61 and is guided by the slots 27 riding the several stud bolts 62 between the wing nuts 63 and the top 60 of the mower hood 61. When the belt 66 is thus tensioned the wing nuts 63 are turned down tightly upon the studs 62 to secure the mounting plate 20 firmly upon the mower hood.

It should here be noted that the bolt 29 in addition to providing a tensioning means for the belt 66 also serves as a stabilizer for the arbor frame 21 to maintain the latter steady and securely adjacent the side of the mower hood during operation of the edger. This assures stability and rotation of the edging blade 11 in a vertical plane as the mower carriage is pushed along adjacent the lawn edge being trimmed.

While I have described my lawn edger attachment in specific detail it will be appreciated by those skilled in the art that it may be susceptible to variation, modification and/or alteration without departing from the spirit of my invention therein. I therefore desired to avail myself of all variations, modifications and/or alterations as may fairly come within the purview of the appended claims.

What I claim as new and desire to protect by Letters Patent is:

1. For mounting a lawn edger on the hood of a power mower having a drive shaft concentric to such hood and drivingly connected by a belt and pulley arrangement to a pulley on an arbor shaft having an edger blade at one of its ends, an attachment member comprising:

a single piece main body having a mounting plate disposed to overlie such hood and provided with slots located parallel to a line radially of the center of such hood, bolt means on said hood extending through the slots in said mounting plate for securing the latter to said hood, a U shaped frame formed on said mounting plate beyond the periphery of such hood and including a downwardly extending leg portion, an integral bight portion extending laterally from the lower end of said downwardly extending leg portion in a direction opposite to said mounting plate, a countershaft secured to said bight portion and the downwardly extending leg portion in the corner of merger thereof for supporting an idler pulley of such pulley arrangement at each end of said countershaft, an upwardly extending leg portion formed integrally with said bight portion in parallel relation to said downwardly extending leg portion of said U shaped frame, and bearings supported in alignment with each other and said leg portions radially of such hood and above and transverse to said countershaft for supporting such arbor shaft with a pulley of said pulley arrangement between said leg portions.

2. The attachment member in accordance with claim 1 including a threaded member threaded through said downwardly extending leg portion parallel to said arbor shaft for engaging the periphery of said hood for tensioning the belt of such belt and pulley arrangement.

3. The attachment member in accordance with claim 1 includes a guard for said edger blade secured to the upwardly extending leg portion of said U shaped frame.

4. The attachment in accordance with claim 3 including a threaded member threaded through said downwardly extending leg portion parallel to said arbor shaft for engaging the periphery of said hood for tensioning the belt of such belt and pulley arrangement.

References Cited by the Examiner

UNITED STATES PATENTS

| 2,976,666 | 3/61 | Machovec | 56—256 |
| 3,053,035 | 9/62 | Earley | 56—25.4 |
| 3,131,491 | 5/64 | Durrschmidt | 56—25.4 |

FOREIGN PATENTS 230,276  10/59  Australia.

ANTONIO F. GUIDA, *Acting Primary Examiner.*

RUSSELL R. KINSEY, *Examiner.*